United States Patent [19]

Ogawa et al.

[11] Patent Number: 4,803,120
[45] Date of Patent: Feb. 7, 1989

[54] MAGNETIC TAPE HAVING A LEADER TAPE

[75] Inventors: Hiroshi Ogawa; Chiaki Mizuno; Yasuo Tamai, all of Odawara, Japan

[73] Assignee: Fuji Photo Film Co., Ltd., Kanagawa, Japan

[21] Appl. No.: 80,153

[22] Filed: Jul. 29, 1987

Related U.S. Application Data

[63] Continuation of Ser. No. 750,129, Jul. 1, 1985, abandoned.

[30] Foreign Application Priority Data

Jun. 29, 1984 [JP] Japan .................................. 59-133009
Jun. 29, 1984 [JP] Japan .................................. 59-133011

[51] Int. Cl.$^4$ ............................................. G11B 5/627
[52] U.S. Cl. .................................... 428/323; 427/128; 428/329; 428/336; 428/694; 428/900
[58] Field of Search ............... 428/323, 329, 480, 694, 428/900, 336; 427/128, 131

[56] References Cited

U.S. PATENT DOCUMENTS

| | | | |
|---|---|---|---|
| 4,275,108 | 6/1981 | Yamaguchi et al. | 428/323 |
| 4,397,911 | 8/1983 | Akashi et al. | 428/900 |
| 4,476,177 | 10/1984 | Mizuno et al. | 427/128 |
| 4,508,782 | 4/1985 | Miura et al. | 428/694 |
| 4,532,172 | 7/1985 | Fujiyama | 427/128 |

*Primary Examiner*—Paul J. Thibodeau
*Attorney, Agent, or Firm*—Armstrong, Nikaido, Marmelstein & Kubovcik

[57] ABSTRACT

A magnetic tape having a leader tape excellent in cleaning effect and free from change of the apppearance and decrease of the cleaning effect even after storage at high temperatures is provided. This magnetic tape has a leader tape at at least one end of the tape, the leader tape comprising a coating layer provided on the one or both sides of a support, and is characterized in that the coating layers contains an inorganic pigment powder with a grain size of 0.01 to 10 μm or a mixture of an inorganic pigment powder with a grain size of 0.01 to 5 μm and a resin powder with a grain size of 0.1 to 10 μm, and a binder, the support has a haze of 20 to 80% and the leader tape has a percent photo-transmission of at least 20%.

9 Claims, No Drawings

MAGNETIC TAPE HAVING A LEADER TAPE

This application is a continuation of application Ser. No. 750,129, filed July 1, 1985, now abandoned.

BACKGROUND OF THE INVENTION

1. Field of the Invention

This invention relates to a magnetic tape having a leader tape and more particularly, it is concerned with a magnetic tape having at at least one end thereof a leader tape capable of cleaning a magnetic head in a magnetic recording device.

2. Description of the Prior Art

In magnetic recording instruments such as audio cassette recorders or video tape recorders, leader tapes are used in combination with the ends of magnetic tapes so as to clean dirt or dust off the recording and reproducing heads in use and the guide poles or rollers in the running paths.

In the leader tapes of the prior art, it is known to provide a cleaning layer on a support by coating thereon an inorganic pigment such as alumina ($Al_2O_3$), silicon carbide (SiC), chromium oxide ($Cr_2O_3$), titanium oxide ($TiO_2$), red oxide ($\alpha$-$Fe_2O_3$) or silicon oxide ($SiO_2$) with a binder (Japanese Patent Publication No. 7631/1980).

Such a cleaning layer has a sufficient cleaning ability, but meets with the disadvantage, on the other hand, that the appearance of the cleaning layer varies and the cleaning ability deteriorates after storage at high temperatures. In order to overcome this disadvantage, a matting method has been proposed comprising subjecting the surface of a support to a sand blasting treatment instead of using abrasives (Utility Model Publication No. 4276/1974). However, the surface roughness obtained by this method is limited and this method often results in lowering of the breaking strength of the support.

A method comprising using an inorganic powder and organic powder has been disclosed in Japanese Patent Application OPI (Kokai) No. 12411/1982. According to this method, the leader tape has a good cleaning effect and head protecting effect in use at room temperature, but after storage at high temperatures, it meets with change of the appearance due to partial clarification and deterioration of the cleaning effect.

SUMMARY OF THE INVENTION

It is a first object of the present invention to provide a magnetic tape having a leader tape, whereby the above described disadvantages of the prior art can be overcome.

It is a second object of the present invention to provide a magnetic tape having a leader tape having an excellent cleaning effect.

It is a third object of the present invention to provide a magnetic tape having a leader tape free from change of the appearance and deterioration of the cleaning effect.

It is a fourth object of the present invention to provide a magnetic tape having a leader tape, which does not or hardly scratches a head surface.

It is a fifth object of the present invention to provide a magnetic tape having a leader tape having a large cramping force when the leader tape is cramped by a hub.

These objects can be attained by a magnetic tape having a leader tape comprising a coating layer provided on one or both sides of a support, at at least one end of the magnetic tape, characterized in that the coating layer contains (a) an inorganic pigment powder with a grain size of 0.01 to 10 $\mu$m and (b) a binder, and the support has a haze of 20 to 80% and the leader tape has a percent photo-transmission of at least 20%. As occasion demands, the coating layer can further contain a resin powder with a grain size of 0.1 to 10 $\mu$m. In both the cases, the inorganic pigment powder is preferably selected from white inorganic pigment powders.

DETAILED DESCRIPTION OF THE INVENTION

The inventors have made various efforts to solve the above described problems and consequently, have reached the present invention.

In a magnetic recording tape having a leader tape comprising a coating layer provided on one or both sides of a support, at at least one end of the magnetic tape, the feature of the present invention consists in that the coating layer contains (a) an inorganic pigment powder with a grain size of 0.01 to 10 $\mu$m and (b) a binder, the support has a haze of 20 to 80% and the leader tape a percent phototransmission of at least 20%. Alternatively, the coating layer can further contain a resin powder with a grain size of 0.1 to 10 $\mu$m.

Examples of the inorganic pigment powder used in the present invention include alumina ($\alpha$-$Al_2O_3$), titanium oxide ($TiO_2$), zinc sulfide (ZnS), barium sulfate ($BaSO_4$), lithopone (ZnS-$BaSO_4$), zinc oxide (ZnO), aluminum silicate ($Al_4(SiO_4)_3 \cdot 5H_2O$), silicon oxide ($SiO_2$), goethite ($\alpha$-FeOOH), titanium yellow ($TiO_2$-NiO-$Sb_2O_3$), chromium oxide ($Cr_2O_3$), cobalt blue (CoO.nSnO) and the like.

Of these inorganic pigment powders, white pigments are preferable such as alumina, titanium oxide, zinc sulfide, lithopone, zinc oxide, aluminum silicate and silicon oxide. These inorganic pigment powders have a grain size of 0.01 to 10 $\mu$m, preferably 0.01 to 5 $\mu$m, more preferably 0.1 to 2 $\mu$m. If the grain size is less than 0.01 $\mu$m, the cleaning effect is markedly lowered, while if more than 10 $\mu$m, head abrasion becomes more and in the formation of a roughened surface, the surface roughness is so large that when winding up a magnetic tape, it is transferred to the magnetic tape to lower the level. These inorganic pigment powders can be used individually or in combination.

Examples of the resin powder used in the present invention include acetylcellulose, polyethylene, polypropylene, polyester resin, polyamide resin, polyacrylonitrile resin, polyacetal resin, phenol resin, urea resin, triazine resin, melamine resin and epoxy resin powders. Above all, polyethylene and triazine type resins are preferable.

These resin powders have generally a mean grain size of 0.1 to 10 $\mu$m, preferably 0.3 to 3 $\mu$m. If the grain size is smaller than 0.1 $\mu$m, the cleaning effect is markedly lowered, while if larger than 10 $\mu$m, occurrence of breakage of a tape is increased when the leader tape is cramped with a hub.

The mixing ratio of an inorganic pigment powder and resin powder, by weight, is 95/5 to 5/95, preferably 90/10 to 10/90. If the mixing ratio is less than 5, head abrasion becomes more, while if more than 95, the cleaning effect is deteriorated.

An inorganic pigment powder or a mixture of an inorganic pigment powder and resin powder is mixed and dispersed in a binder and then coated onto a support.

Examples of the binder used in the present invention include well known resins such as vinyl chloride-vinyl acetate copolymers, vinylidene chloride copolymers, nitrocellulose, polyester resins, polyurethane resins, polyisocyanates and the like. Above all, vinyl chloride-vinyl acetate copolymers, polyurethane resins and polyisocyanates are preferable.

These binders are generally used in a proportion of 15 to 600 parts by weight, preferably 30 to 600 parts by weight, more preferably 25 to 400 parts by weight, most preferably 50 to 400 parts by weight to 100 parts by weight of the inorganic pigment powder or mixture of the inorganic pigment powder and resin powder. The percent photo-transmission can be varied by varying the ratio of the powder and binder. The powder and binder are mixed and dispersed in an organic solvent. As the organic solvent, there can be used any organic solvent which does not react with the powders, is capable of dissolving the binders and has a boiling point of about 60° to 200° C. Useful examples of the organic solvent include ketones such as methyl ethyl ketone, methyl isobutyl ketone, cyclohexanone and the like, and acetic acid esters such as ethyl acetate, butyl acetate and the like. In addition, toluene, xylene and the like can be used as a diluent.

The thus obtained composition is coated onto the one or both sides of a support partly or wholly. Generally, the coating thickness is in the range of 0.1 to 10 μm, preferably 0.3 to 5 μm. The support used in the present invention is a semi-transparent support having a haze of 20 to 80%, which can be obtained by adding, external grains, a white inorganic powder to a support of polyethylene terephthalate, polypropylene, polycarbonate or polyethylene naphthalate, or by precipitating therein a catalyst for the polymerization reaction as internal grains.

Methods of obtaining the above described supports have hitherto been known, for example, as disclosed in Japanese Patent Publication No. 23888/1968, in which it is described to use a polyester containing 0.01 to 5% by weight of an oxide or inorganic salt of a Group II, III or IV element of Periodic Table, which is inert to the polyester and has a means grain diameter of 0.1 to 10 μm.

Japanese Patent Publication No. 20496/1980 describes a polyester film containing 0.2 to 3.0% by weight of lithium-containing internal grains. Japanese Patent Application OPI (Kokai) No. 116066/1976 describes addition of internal grains consisting predominantly of lithium, calcium and phosphorus chemically inert external grains having a means grain size of 1.0 to 10.0 μm and being selected from oxides or inorganic salts of Group II, III and IV elements of Periodic Table.

The support used in the present invention has a haze of at least 20%, preferably 40%. If the haze is less than 20%, the leader tape encounters change of the appearance (clarification) and decrease of the cleaning effect after storage at high temperatures. If the haze is more than 80%, the leader tape has a decreased percent photo-transmission and a insignificant strength and it is difficult to detect the end of a magnetic tape by means of a photoelectric senser.

Preferably, the heat shrinkage of the support is as small as possible, for example, 3% or less, more preferably 1% or less after storage at 110° C. for 4 hours.

On the other hand, the leader tape of the present invention is so controlled that the percent photo-transmission is 20% or more, since if it is less than 20%, it is difficult to detect the end of the magnetic tape by means of a photoelectric senser. Control of the percent photo-transmission is carried out, for example, by the following procedures:

(1) Mixing an inorganic pigment powder having a large hiding power and another inorganic pigment (extender) having a small hiding powder, (2) Changing the mixing ratio of an inorganic pigment powder and a resin powder having a smaller hiding power (larger percent photo-transmission), (3) Changing the thickness of the coating layer, and (4) Coating the above described mixture onto the support in such a manner that the resin powder is in the form of islands with a diameter of 5 to 20 μm and an interval of 5 to 20 μm, whereby the percent photo-transmission can be controlled by 10-30%.

In the present invention, the leader tape can be provided further with an antistatic layer. Such an antistatic layer can be coated onto the surface of the support (opposite to the coating layer). The coating amount is preferably 300 mg/m² or less, more preferably 5 to 150 mg/m² on the cleaning surface and preferably 200 mg/m² or less, more preferably 5 to 100 mg/m² on the support surface. In some case, an antistatic layer is absorbed in the coating layer, which embodiment is within the scope of the present invention.

According to the present invention, in particular, when an antistatic agent is coated onto a roughened surface, the antistatic agent remains firmly in the concave parts on the surface, which effect is not so deteriorated by repeated running. When an antistatic agent is coated onto the roughened surface and wiped off, a part of the antistatic agent is removed to the binder surface layer, which effect is less deteriorated.

In the present invention, a dispersing agent can also be used so as to improve the dispersibility of an inorganic pigment powder or a mixture of an inorganic pigment powder and resin powder in a binder. Furthermore, a lubricant can jointly be used if necessary. As these additives, any of known dispersing agents, lubricants and antistatic agents can be used, for example, as disclosed in Japanese Patent Application OPI (Kokai) No. 108804/1977 (incorporated by reference).

If necessary, the leader tape of the present invention can further be printed with letters or marks, for example, as disclosed in Utility Model Application OPI (Kokai) Nos. 2209/1976 and 72924/1978.

The following examples are given in order to illustrate the present invention without limiting the same. It will be obvious to one skilled in the art that various changes and modifications can be made in the components, ratios, operational order and the like without departing from the spirit of the present invention. All parts in Examples are to be taken as those by weight.

EXAMPLE 1

| | |
|---|---|
| Alumina Powder (mean grain size 0.7 μm) | 50 parts |
| Polyethylene (mean grain size 2.5 μm) | 50 |
| Vinyl Chloride-Vinyl Acetate Copolymer (vinyl chloride:vinyl acetate = 87:13, degree of polymerization 430) | 50 |

| | | | -continued | |
|---|---|---|---|---|
| Polyester Polyurethane (molecular weight 150,000) | | | | 30 |
| Polyisocyanate (commercial name: Desmodur L, solid content in 75%) | | | | 20 |
| solution | | | | |
| Methyl Ethyl Ketone | | | | 500 |

The above described components were well blended to prepare a coating composition for a leader tape and coated onto a support of polyethylene terephthalate (referred hereinafter to as PET) with a thickness of 20 μm having a haze as shown in Table 1 to give a coating thickness of 4 μm on dry basis, followed by drying. This tape was slit in a width of 3.8 mm to obtain a leader tape for a compact cassette (Sample Nos. 1–7).

This leader tape was cramped by a hub to examine the cramp force and the state of breakage of the tape at that time, and 1 m of this leader tape was loaded in a cassette half, which was then subjected to running in a cassette recorder having a magnetic head previously dirty, to examine the number of times required for removing the dirt. Thus, the less the number of times required for removing the dirt, the larger the cleaning effect. At the same time, scratch of the head surface was examined when subjected to running of the same number of times.

50 cm of the above described leader tape was combined with 135 m of a magnetic tape having a total thickness of 12 μm and then with 50 cm of the above described leader tape, and loaded in a heat resisting cassette half.

This cassette tape was stored at 90° C. for 6 hours and thereafter, change of the appearance of the leader at the side of the hub was examined. After removing the magnetic tape, the leader tape was subjected to running in a cassette recorder having a magnetic head previously made dirty to examine the number of times required for removing the dirt. The results are shown in Table 1:

TABLE 1

| Sample No. | Haze (%) | Cramp Force (g) | Breakage Ratio at Cramping (%) | Cleaning Effect (times) | Head Scratch | Missing of Coating Layer | Percent Photo-transmission (%) | After storage 90° C. × 6 hr | |
|---|---|---|---|---|---|---|---|---|---|
| | | | | | | | | Change of Appearance | Cleaning Effect (times) |
| 1 | 5 | 1800 or more | 0 | 3 | no | no | 87 | yes | 6 |
| 2 | 10 | 1800 or more | 0 | 2 | " | " | 82 | somewhat | 4 |
| 3 | 20 | 1800 or more | 0 | 1 | " | " | 71 | no | 2 |
| 4 | 40 | 1800 or more | 0 | 1 | " | " | 50 | " | 1 |
| 5 | 60 | 1800 or more | 0 | 1 | " | " | 34 | " | 1 |
| 6 | 80 | 1600 | 0 | 1 | " | " | 12 | " | 1 |
| 7 | 90 | 1400 | 0.1 | 1 | " | " | 2 | " | 1 |

As is evident from the results of Table 1, if the haze of the support is less than 20%, change of the appearance occurs after storage at 90° C. for 6 hours and the cleaning effect is decreased. If the haze is more than about 80%, the cramp force is inferior and the percent photo-transmission is too small. Thus, the haze range outside 20 to 80% is not favourable.

EXAMPLE 2

The procedure of Example 1 was repeated except using titanium oxide powder (mean grain size 2.5 μm) instead of the alumina powder, thus obtaining leader tapes (Sample Nos. 8 to 14) having properties as shown in Table 2.

It is apparent from the results of Table 2 that even when the inorganic pigment is changed, change of the appearance occurs and the cleaning effect decreases after storage at 90° C. for 6 hours if the haze of the support is less than 20%, as in the case of Example 1.

TABLE 2

| Sample No. | Haze (%) | Cramp Force (g) | Breakage Ratio at Cramping (%) | Cleaning Effect (times) | Head Scratch | Missing of Coating Layer | Percent Photo-transmission (%) | After storage 90° C. × 6 hr | |
|---|---|---|---|---|---|---|---|---|---|
| | | | | | | | | Change of Appearance | Cleaning Effect (times) |
| 8 | 5 | 1800 or more | 3 | 3 | no | no | 88 | yes | 6 |
| 9 | 10 | 1800 or more | 0 | 2 | " | " | 84 | somewhat | 4 |
| 10 | 20 | 1800 or more | 0 | 1 | " | " | 73 | no | 2 |
| 11 | 40 | 1800 or more | 0 | 1 | " | " | 51 | " | 1 |
| 12 | 60 | 1800 or more | 0 | 1 | " | " | 36 | " | 1 |
| 13 | 80 | 1600 more | 0 | 1 | " | " | 13 | " | 1 |
| 14 | 90 | 1400 | 0.1 | 1 | " | " | 3 | " | 1 |

EXAMPLE 3-1

The procedure of Example 1 was repeated except using a triazine type resin powder (mean grain diameter 1.5 μm) instead of the polyethylene powder of Example 1, thus obtaining leader tapes (Sample Nos. 15 to 21) having properties as shown in Table 3.

It is apparent from the results of Table 3 that even if the resin powder is changed, the substantially similar results to Table 1 are obtained.

EXAMPLE 3-2

The procedure of Example 1 was repeated except using a triazine type resin powder with a mean grain diameter of 1.5 μm and alumina powder with a mean grain diameter of 5 μm in place of the polyethylene powder and alumina powder of Example 1, thus obtaining leader tapes (Sample Nos. 22 and 23) having properties as shown in Table 3.

ylene powder of Example 1 as shown in Table 4, thus obtaining leader tapes (Sample Nos. 26 to 34) having properties as shown in Table 4. It will clearly be understood from the results of Table 4 that if the resin powder is in a proportion of less than 5% by weight, the head surface tends to be scratched, while if the inorganic pigment powder is in a proportion of less than 5% by weight, the cleaning effect is inferior and change of the appearance after storage at 90° C. for 6 hours occurs.

TABLE 4

| Sample No. | Alumina Powder (parts) | Polyethylene Powder (parts) | Cramp Force (g) | Breakage Ratio at Cramping (%) | Cleaning Effect (times) | Head Scratch | Missing of Coating Layer | Percent Photo-transmission (%) | After Storage at 90° C. for 6 hrs Change of Appearance | Cleaning Effect (times) |
|---|---|---|---|---|---|---|---|---|---|---|
| 26 | 100 | 0 | 1800 or more | 0.1 | 1 | yes | no | 46 | no | 1 |
| 27 | 95 | 5 | 1800 or more | 0 | 1 | somewhat | " | 47 | " | 1 |
| 28 | 90 | 10 | 1800 or more | 0 | 1 | " | " | 48 | " | 1 |
| 29 | 75 | 25 | 1800 or more | 0 | 1 | " | " | 49 | " | 1 |
| 30 | 50 | 50 | 1800 or more | 0 | 1 | " | " | 51 | " | 1 |
| 31 | 25 | 75 | 1800 or more | 0 | 1 | " | " | 53 | " | 1 |
| 32 | 10 | 90 | 1800 or more | 0 | 1 | " | " | 54 | " | 1 |
| 33 | 5 | 95 | 1800 or more | 0 | 2 | " | " | 54 | somewhat | 2 |
| 34 | 0 | 100 | 1700 | 0 | 4 | " | " | 55 | yes | 4 |

EXAMPLE 3-3

The procedure of Example 1 was repeated except using a triazine type resin with a mean grain size of 5 μm and titanium oxide powder with a mean grain size of 0.5 μm in place of the polyethylene powder and alumina powder of Example 1 to thus obtain leader tapes (Sample Nos. 24 and 25) having properties shown in Table 3:

EXAMPLE 5

The procedure of Example 1 was repeated except using PET wit a haze of 40$% as a support, using 50 parts of the alumina powder and 50 parts of the polyethylene powder of Example 1 and changing only the total amount of the vinyl chloride-vinyl acetate copolymer, polyesterpolyurethane and polyisocyanate, used as the binder in Example 1, to 100 parts of the above described powders, without changing the relative proportion of these binder components, thus obtaining leader tapes (Sample Nos. 35 to 41) having properties as shown in Table 5.

TABLE 3

| Sample No. | Haze (%) | Cramp Force (g) | Breakage Ratio at Cramping (%) | Cleaning Effect (times) | Head Scratch | Missing of Coating Layer | Percent Photo-transmission (%) | After storage 90° C. × 6 hr Change of Appearance | Cleaning Effect (times) |
|---|---|---|---|---|---|---|---|---|---|
| 15 | 5 | 1800 or more | 0 | 2 | no | no | 86 | yes | 5 |
| 16 | 10 | 1800 or more | 0 | 2 | " | " | 83 | somewhat | 3 |
| 17 | 20 | 1800 or more | 0 | 1 | " | " | 71 | no | 2 |
| 18 | 40 | 1800 or more | 0 | 1 | " | " | 50 | " | 1 |
| 19 | 60 | 1800 or more | 0 | 1 | " | " | 34 | " | 1 |
| 20 | 80 | 1600 | 0 | 1 | " | " | 12 | " | 1 |
| 21 | 90 | 1400 | 0.1 | 1 | " | " | 3 | " | 1 |
| 22 | 20 | 1800 or more | 0 | 1 | " | " | 75 | " | 1 |
| 23 | 40 | 1800 or more | 0 | 1 | " | " | 54 | " | 1 |
| 24 | 20 | 1800 or more | 0 | 2 | " | " | 74 | " | 2 |
| 25 | 40 | 1800 or more | 0 | 2 | " | " | 52 | " | 2 |

EXAMPLE 4

The procedure of Example 1 was repeated except using PET with a haze of 40% as a support and changing the proportion of the alumina powder and polyeth- It is apparent from Table 5 that if the amount of the binder is less than about 25 parts, the coating layer tends to be stripped, while if more than 600 parts, there occur change of the appearance and deterioration of the cleaning effect after storage at 90° C. for 6 hours.

In Table 6, the degree of adhesion to an adhesive tape was examined as follows:

A: The adhered surface is not slipped even by a tension of 700 g, nor slipped by applying a tension of 300 g for 30 minutes.

TABLE 5

| Sample No. | Total Amount of Binder (parts) | Cramp Force (g) | Breakage Ratio at Cramping (%) | Cleaning Effect (times) | Head Scratch | Missing of Coating Layer | Percent Phototransmission (%) | After Storage 90° C. × 6 hrs Change of Appearance | Cleaning Effect (times) |
|---|---|---|---|---|---|---|---|---|---|
| 35 | 25 | 1600 | 0 | 1 | no | somewhat | 48 | no | 1 |
| 36 | 50 | 1800 or more | 0 | 1 | " | little | 49 | " | 1 |
| 37 | 100 | 1800 or more | 0 | 1 | " | no | 50 | " | 1 |
| 38 | 200 | 1800 or more | 0 | 1 | " | " | 51 | " | 1 |
| 39 | 300 | 1800 or more | 0 | 1 | " | " | 51 | " | 1 |
| 40 | 500 | 1800 or more | 0 | 1 | " | " | 52 | " | 2 |
| 41 | 600 | 1800 or more | 0 | 2 | " | " | 52 | somewhat | 4 |

EXAMPLE 6

Using a PET support with a haze of 40%, bulk rolls for leader tapes were obtained in an analogous manner to Example 1. The bulk rolls were subjected to coating of an alcoholic solution of an antistatic agent onto the cleaning surface (right side) or support surface (back side) and then rubbed with a cotton cloth to examine the electrification property by a distance at which cigarette ash was attracted when the rubbed leader tape was put over the cigarette ash. The longer the attraction distance, the stronger the electrification property.

The employed conditions and results are shown as to Sample Nos. 42 to 50 in Table 6. The antistatic agents used herein were of a quaternary ammonium salt type (commercial name: EFUKOORU 72 manufactured by Matsumoto Yushi KK), alkylphosphate type (commercial name: PMX-3001 manufactured by Yoshimura Yukagaku KK) and polyoxyethylene type (commercial name: TENRO DA-40 manufactured by Napco Chemical Co.)

B: The adhered surface is not slipped even by a tension of 700 g and slipped by 25 μm or less when applying a tension of 300 g for 30 minutes.

C: The adhered surface is not slipped even by a tension of 500 g and slipped by 30 μm or less when applying a tension of 300 g for 30 minutes.

It is apparent from Table 6 that application of antistatic agents results in decrease of the electrification property. If the amount of an antistatic agent coated exceeds 150 mg/m² on the cleaning surface or 100 mg/m² on the support surface, the adhesion of a leader tape and adhesive tape is deteriorated.

As is apparent from the foregoing results, the preferred embodiment of the present invention, leaders tapes each having a coating layer comprising a mixture of an inorganic pigment powder and resin powder on a support with a haze of 20 to 80% can achieve the object of the present invention.

TABLE 6

| Sample No. | Antistatic Agent | Antistatic Agent-Coated Surface | Amount of Antistatic Agent Coated (mg/m²) | Electrification Property (cm) | Degree of Adhesion to Tape | After storage at 90° C. for 6 hrs Change of Appearance | Electrification property (cm) | Degree of Adhesion to Adhesive Tape |
|---|---|---|---|---|---|---|---|---|
| 42 | — | — | — | 8.5 | A | no | 8.5 | A |
| 43 | EFUKOORU 72 | Cleaning Surface (right side) | 5 | 1.0 | A | " | 1.0 | A |
| 44 | " | Cleaning Surface (right side) | 50 | 0.5 | A | " | 0.5 | A |
| 45 | " | Cleaning Surface (right side) | 150 | 0.5 | B | " | 0.5 | B |
| 46 | " | Cleaning Surface (right side) | 300 | 0.5 | C | " | 0.5 | C |
| 47 | " | Support Surface (back side) | 50 | 1.0 | A | " | 1.0 | A |
| 48 | " | Support Surface (back side) | 100 | 0.5 | B | " | 0.5 | B |
| 49 | PMX-3001 | Support Surface (back side) | 50 | 0.5 | A | " | 0.5 | A |
| 50 | TENRO DA-40 | Support Surface (back side) | 50 | 1.0 | A | " | 1.0 | A |

EXAMPLE 7-1

| | |
|---|---|
| Alumina Powder (mean grain size 0.5 μm) | 100 parts |
| Vinyl Chloride-Vinyl Acetate Copolymer (Vinyl Chloride:Vinyl Acetate = 87:13, Degree of Polymerization 430) | 50 |
| Polyester Polyurethane (molecular weight 150,000) | 30 |
| Polyisocyanate (commercial name: Desmodur L, solid content in 75% solution) | 20 |
| Methyl Ethyl Kitone | 500 |

The above described components were well blended to prepare a coating composition for a leader tape and coated onto a support of PET with a thickness of 20 μm having a haze as shown in Table 7 to give a coating thickness of 8 μm on dry basis, followed by drying. This tape was slit in a width of 3.8 mm to obtain a leader tape for a compact cassette (Sample Nos. 51 to 59).

The resulting leader tape was cramped by a hub to examine the cramp force and the state of breakage of the tape at that time, and 1 m of this leader tape was loaded in a cassette half, which was then subjected to running in a cassette recorder having a magnetic head previously made dirty to examine the number of times required for removing the dirt. Thus, the less the number of times required for removing the dirt, the larger the cleaning effect. At the same time, scratch of the head surface was examined when subjected to running of the same number of times.

50 cm of the above described leader tape was combined with 135 m of a magnetic tape with a total thickness of 12 μm and then with 50 cm of the above described leader tape, and loaded in a heat resisting cassette half. This cassette tape was stored at 110° C. for 4 hours and thereafter, change of the appearance of the leader tape was examined. After removing the magnetic tape, the leader tape was subjected to running in a cassette recorder having a magnetic head previously made dirty to examine the number of times required for removing the dirt.

The results are shown in Table 7 as Sample Nos. 51 to 57.

EXAMPLE 7-2

The procedure of Example 7-1 was repeated except using an alumina powder with a mean grain size of 5 μm instead of the alumina powder with a mean grain size of 0.5 μm of Example 7-1, thus obtaining a leader tapes (Sample Nos. 58 and 59) having properties as shown in Table 7:

TABLE 7

| Sample No. | Haze (%) | Cramp Force (g) | Breakage Ratio at Cramping (%) | Cleaning Effect (times) | Head Scratch | Missing of Coating Layer | Percent of Photo-transmission (%) | After Storage 110° C. × 4 hrs Change of Appearance | After Storage 110° C. × 4 hrs Cleaning Effect (times) |
|---|---|---|---|---|---|---|---|---|---|
| 51 | 5 | 1800 or more | 0 | 2 | no | no | 83 | yes | 6 |
| 52 | 10 | 1800 or more | 0 | 1 | " | " | 79 | somewhat | 4 |
| 53 | 20 | 1800 or more | 0 | 1 | " | " | 70 | no | 2 |
| 54 | 40 | 1800 or more | 0 | 1 | " | " | 50 | " | 1 |
| 55 | 60 | 1800 or more | 0 | 1 | " | " | 29 | " | 1 |
| 56 | 80 | 1600 | 0 | 1 | " | " | 11 | " | 1 |
| 57 | 90 | 1400 | 0.3 | 1 | " | " | 2 | " | 1 |
| 58 | 20 | 1800 or more | 0 | 1 | " | " | 75 | " | 1 |
| 59 | 40 | 1800 or more | 0 | 1 | " | " | 56 | " | 1 |

As is evident from the results of Table 7, if the haze of the support is less than 20%, change of the appearance occurs and the cleaning effect is decreased after storage at 110° C. for 4 hours.

EXAMPLE 8

The procedure of Example 7-1 was repeated except using titanium oxide powder (mean grain size 2.5 μm) instead of the alumina powder of Example 7-1, thus obtaining magnetic tapes having leader tapes (Sample Nos. 60 to 66) having properties as shown in Table 8.

It is apparent from the results of Table 8 that even when the inorganic pigment powder is changed, change of the appearance occurs and the cleaning effect decreases after storage at 110° C. for 4 hours, if the haze of the support is less than 20%, as in the case of Example 7-1.

TABLE 8

| Sample No. | Haze (%) | Cramp Force (g) | Breakage Ratio at Cramping (%) | Cleaning Effect (times) | Head Scratch | Missing of Coating Layer | Percent Photo-transmission (%) | After Storage 100° C. × 4 hrs Change of Appearance | After Storage 100° C. × 4 hrs Cleaning Effect (times) |
|---|---|---|---|---|---|---|---|---|---|
| 60 | 5 | 1800 or more | 0 | 3 | no | no | 81 | yes | 7 |
| 61 | 10 | 1800 or more | 0 | 2 | " | " | 78 | somewhat | 4 |
| 62 | 20 | 1800 or more | 0 | 1 | " | " | 67 | no | 2 |
| 63 | 40 | 1800 or more | 0 | 1 | " | " | 50 | " | 1 |
| 64 | 60 | 1800 or more | 0 | 1 | " | " | 31 | " | 1 |

TABLE 8-continued

| Sample No. | Haze (%) | Cramp Force (g) | Breakage Ratio at Cramping (%) | Cleaning Effect (times) | Head Scratch | Missing of Coating Layer | Percent Photo-transmission (%) | After Storage 100° C. × 4 hrs Change of Appearance | Cleaning Effect (times) |
|---|---|---|---|---|---|---|---|---|---|
| 65 | 80 | 1600 more | 0 | 1 | " | " | 11 | " | 1 |
| 66 | 90 | 1500 | 0.2 | 1 | " | " | 2 | " | 1 |

EXAMPLE 9

The procedure of Example 7-1 was repeated except using PET with a haze of 40% as a support, using 100 parts of only alumina powder with a mean grain size of 2.5 μm and changing the total amounts of the vinyl chloride-vinyl acetate copolymer, polyester polyurethane and polyisocyanate, used as the binder in Example 7-1, without changing the relative proportion of these binder components, thus obtaining leader tapes (Sample Nos. 67 to 73) having properties as shown in Table 9.

It is apparent from Table 9 that if the amount of the binder is less than about 25 parts, the coating layer tends to be stripped and the percent photo-transmission is lowered, while if more than 400 parts, there occur change of the appearance and deterioration of the cleaning effect after storage at 110° C. for 4 hours.

EXAMPLE 10

Using a PET support with a haze of 40%, bulk rolls for leader tapes were obtained in an analogous manner to Example 7-1. The bulk rolls were subjected to coating of an alcoholic solution of an antistatic agent onto the cleaning surface (right side) or support surface (back side) and then rubbed with a cotton cloth to examine the electrification property in an analogous manner to Example 6.

The employed conditions and results are shown as to Sample Nos. 74 to 82 in Table 10. The antistatic agents used herein were the same as those of Example 6.

TABLE 10

| Sample No. | Antistatic Agent | Antistatic Agent-Coated Surface | Amount of Antistatic Agent Coated (mg/m²) | Electrification Property (cm) | Degree of Adhesion to Adhesive Tape | After Storage at 110° C. for 4 hours | | |
|---|---|---|---|---|---|---|---|---|
| | | | | | | Change of Appearance | Electrification Property | Degree of Adhesion to Adhesive Tape |
| 74 | — | — | — | 8.5 | A | no | 8.5 | A |
| 75 | EFUKOORU 72 | Cleaning Surface | 5 | 1.0 | A | " | 1.0 | A |
| 76 | " | Cleaning Surface | 50 | 0.5 | A | " | 0.5 | A |
| 77 | " | Cleaning Surface | 150 | 0.5 | B | " | 0.5 | B |
| 78 | " | Cleaning Surface | 300 | 0.5 | C | " | 0.5 | C |
| 79 | " | Support Surface | 50 | 1.0 | A | " | 1.0 | A |
| 80 | " | Support Surface | 100 | 0.5 | B | " | 0.5 | B |
| 81 | PMX-3001 | Support Surface | 50 | 0.5 | A | " | 0.5 | A |
| 82 | TENRO DA-40 | Support Surface | 50 | 1.0 | A | " | 1.0 | A |

In Table 10, the degree of adhesion to an adhesion tape was examined in an analogous manner to Table 6.

It is apparent from Table 10 that application of an antistatic agent results in decrease of the electrification property. If the amount of an antistatic agent coated exceeds 150 mg/m² on the cleaning surface or 100

TABLE 9

| Sample No | Binder (parts) | Cramp Force (g) | Breakage Ratio at Cramping (%) | Cleaning Effect (times) | Head Scratch | Missing of Coating Layer | Percent Photo-transmission (%) | After Storage at 110° C. for 4 hrs Change of Appearance | Cleaning Effect (times) |
|---|---|---|---|---|---|---|---|---|---|
| 67 | 15 | 1600 | 0 | 1 | no | somewhat | 34 | no | 1 |
| 68 | 25 | 1700 | 0 | 1 | " | " | 37 | " | 1 |
| 69 | 50 | 1800 or more | 0 | 1 | " | no | 48 | " | 1 |
| 70 | 100 | 1800 or more | 0 | 1 | " | " | 50 | " | 1 |
| 71 | 200 | 1800 or more | 0 | 1 | " | " | 53 | " | 1 |
| 72 | 400 | 1800 or more | 0 | 2 | " | " | 56 | somewhat | 3 |
| 73 | 600 | 1800 or more | 0 | 2 | " | " | 58 | yes | 5 | mg/m² on the support surface, the adhesion of the leader tape and adhesive tape is deteriorated.

As is apparent from the foregoing results, the other preferred embodiment of the present invention, i.e. leader tapes each having a coating layer comprising an inorganic pigment powder with a grain size of 0.01 to 10 μm and a binder on a support with a haze of 20 to 80%, and having a percent photo-transmission of at least 20% can attain the objects of the present invention.

A magnetic tape having the leader tape according to the present invention exhibits an excellent cleaning effect in spite of decreased scratch on a head surface, and is free from change of the appearance and decrease of the cleaning effect even after storage at higher temperatures.

What is claimed is:

1. A magnetic tape having a leader tape comprising a coating layer provided on one or both sides of a support, at at least one end of the magnetic tape, characterized in that the coating layer contains (a) an inorganic pigment powder with a grain size of 0.01 to 10 um and (b) a binder, in an amount of 25 to 600 parts per 100 parts of the powders, and the support is semi-transparent and is formed from a material selected from polyethylene terephthalate, polypropylene, polycarbonate and polyethylene naphthalate, and contains a white inorganic powder added as external grains, and has a haze of 40 to 80% and the leader tape has a percent photo-transmission of at least 20%.

2. A magnetic tape having a leader tape comprising a coating layer provided on one or both sides of a support, at at least one end of the magnetic tape, characterized in that the coating layer contains (a) an inorganic pigment powder with a grain size of 0.01 to 10 um, (b) a resin powder with a grain size of 0.1 to 10 um, in a mixing ratio of inorganic pigment and resin powder of 95/5 to 5/95 and (c) a binder, in an amount of 25 to 600 parts per 100 parts of the powders, and the support is semi-transparent and is formed from a material selected from polyethylene terephthalate, polypropylene, polycarbonate and polyethylene naphthalate, and contains a white inorganic powder added as external grains, and has a haze of 40 to 80% and the leader tape has a percent photo-transmission of at least 20%.

3. The magnetic tape having a leader tape as claimed in claim 1 or 2, wherein the inorganic pigment powder is at least one member selected from the group consisting of alumina, titanium oxide, zinc aulfide, barium sulfate, lithopone, zinc oxide, aluminum silicate, silicon oxide, goethite, titanium yellow, chromium oxide and cobalt blue.

4. The magnetic tape having a leader tape as claimed in claim 1 or 2, wherein the inorganic pigment powder is a white inorganic pigment powder.

5. The magnetic tape having a leader tape as claimed in claim 4, wherein the white inorganic pigment powder is at least one member selected from the group consisting of alumina, titanium oxide, zinc sulfide, lithopone, zinc oxide, aluminum silicate and silicon oxide.

6. The magnetic tape having a leader tape as claimed in claim 2, wherein the resin powder is at least one member selected from the group consisting of acetylcellulose, polyethylene, polypropylene, polyester, polyamide, polyacrylonitrile, polyacetal, phenol resin, urea resin, triazine resin, melamine resin and epoxy resin powders.

7. The magnetic tape having a leader tape as claimed in claim 1 or 2, wherein the binder is at least one member selected from the group consisting of vinyl chloride-vinyl acetate copolymers, vinylidene chloride copolymers, nitrocellulose, polyester resins, polyurethane resins and polyisocyanates.

8. The magnetic tape having a leader tape as claimed in claim 2, wherein the binder is used in a proportion of 30 to 600% by weight to the powders (a) and (b).

9. The magnetic tape having a leader tape as claimed in claim 1 or 2, wherein the coating layer has a thickness of 0.1 to 10 μm.

10. The magnetic tape having a leader tape as claimed in claim 1, wherein the heat shrinkage of the support is at most 3% after storage at 110° C. for 4 hours.

11. The magnetic tape having a leader tape as claimed in claim 1, wherein the heat shrinkage of the support is at most 1% after storage at 110° C. for 4 hours.

* * * * *